United States Patent
Poyourow (10) Patent No.: US 7,305,387 B2
(45) Date of Patent: Dec. 4, 2007

(54) METHOD AND APPARATUS FOR MANAGING DATA OBJECT SIZE IN A MULTI-USER ENVIRONMENT

(75) Inventor: David Poyourow, Los Angeles, CA (US)

(73) Assignee: SAP, Aktiengesellschaft, Walldorf (DE)

( * ) Notice: Subject to any disclaimer, the term of this patent is extended or adjusted under 35 U.S.C. 154(b) by 61 days.

(21) Appl. No.: 11/026,524

(22) Filed: Dec. 30, 2004

(65) Prior Publication Data

US 2006/0167922 A1 Jul. 27, 2006

(51) Int. Cl.
*G06F 17/30* (2006.01)
(52) U.S. Cl. .............................. 707/4; 707/10; 711/171
(58) Field of Classification Search .............. 707/1–10, 707/100–104.1, 200–206, 217–219, 171–172; 711/217–219, 171–172
See application file for complete search history.

(56) References Cited

U.S. PATENT DOCUMENTS

| | | | |
|---|---|---|---|
| 5,506,980 A * | 4/1996 | Inagami et al. | 711/159 |
| 5,999,943 A * | 12/1999 | Nori et al. | 707/104.1 |
| 6,061,678 A * | 5/2000 | Klein et al. | 707/3 |
| 6,243,718 B1 * | 6/2001 | Klein et al. | 707/203 |
| 6,738,790 B1 * | 5/2004 | Klein et al. | 707/203 |

OTHER PUBLICATIONS

T. J. Lehman et al., DB2 LOB: The Teenage Years, 1996, IEEE, 192-199.*
Dubnicki et al., Adjustable block Size Coherent Caches, 1992, ACM, 170-180.*
Steven PrzybyLski, The Performance Impact of Block Sizes and Fetch Strategies, 1990, IEEE, 160-169.*

* cited by examiner

*Primary Examiner*—Jean Bolte Fleurantin
(74) *Attorney, Agent, or Firm*—Dalina Law Group, P.C.

(57) ABSTRACT

Improved communication with database for multiple clients utilizing large date objects concurrently. When interacting with a server with data objects over threshold size, minimizes system resource usage such as CPU and network utilization. Segments objects into smaller size chunks, allowing for transmission of smaller chunks which prevents server from allocating large blocks of memory to one object. Although server handles more memory allocations, each allocation is smaller in size and can therefore be processed much faster. Determination of chunk size is dependent on inherent system resources such as the amount of server memory, available network bandwidth. Chunk size is dependent on environmental factors such as time of day, day of week, number of users, number of predicted users for a given time and day based on historical logging, current and predicted network utilization for given time and day. Chunk size and chunk transfer size may be altered dynamically.

23 Claims, 6 Drawing Sheets

METHOD AND APPARATUS FOR MANAGING DATA OBJECT SIZE IN A MULTI-USER ENVIRONMENT

BACKGROUND OF THE INVENTION

U.S. patent application entitled "TOOL FOR OPTIMIZING SYSTEM PERFORMANCE AND METHODS RELATING TO SAME", filed Dec. 30, 2004 to the same inventor is hereby incorporated herein by reference.

1. Field of the Invention

Embodiments of the invention described herein pertain to the field of computer software. More particularly, but not by way of limitation, one or more embodiments of the invention enable efficient communication with a database comprising binary large object (BLOB) data.

2. Description of the Related Art

The primary use of database systems is to function as a mechanism for users to store and retrieve data. Hence most database systems act as a repository for various types of data including characters, numbers and other basic data types. In addition, data types including objects, images, video and other types of data are supported by most existing databases.

Within the last several years, as hard drive capacities and network bandwidth have continually increased, it has become significantly more common than was previously the case for database users to store and retrieve large data objects. Storing and retrieving such large data objects (e.g., image and video objects) can inhibit the efficiency of a DBMS system and reduce overall system performance. This is because most database systems are not designed to handle widespread access to large data objects and hence there is a significant burden placed on the system when access to these large data objects becomes a regular part of day to day operations. This reduced performance during storage and retrieval of large objects is caused by a number of different factors.

When a large data object is retrieved by a client the database reads the entire object with one read operation. This retrieval operation in turn causes the database to allocate a segment of memory on the database server in which to read the entire data object being retrieved. On a small scale such allocations can reduce performance, but do not necessarily cause a substantial drop in overall system performance. However, when such requests become more common and many users across the entire system request large objects, systems are required to handle many threads asking for similar functions thus causing a significant reduction in system performance. If for instance, 30 users initiate requests to retrieve different PDF objects where each object is approximately 100 mb in size, then the server allocates approximately 3 Gb of memory. In many cases the occurrence of such an allocation requirement will impact system performance.

The impact of retrieving and storing large data objects on memory occurs when a DBMS is asked to take other actions at the direction of the client (e.g., insert, update, etc. . . . ). Microsoft SQL Server, for instance, typically allocates 4 times the amount of memory of the object to be inserted. So in cases where a 50 MB object is to be inserted the server allocates approximately 200 MB of memory to the insert task.

Another problem that occurs when large data objects are transmitted between a client and server is that the transmission of such objects causes an increase in the number of network collisions which in turn places a noticeable burden on the network and reduces overall system efficiency.

To alleviate the burdens placed on a system when utilizing large blocks of data a technique known as "blob chunking" is used to read smaller blocks of data from a BLOB field until the entire BLOB field is read. Blob chunking may also be used to write a series of smaller blocks of data to a BLOB field until the entire BLOB field is written. To date there has been no way to intelligently determine the size of blocks to break a read or a write of a BLOB field into as current attempts at BLOB chunking merely attempt to allow a system to operate without returning an "out of memory" error for example.

Because of the limitations described above there is a need for a system that allows greater efficiency in situations where large data objects are transferred between a server and a client.

SUMMARY OF THE INVENTION

One or more embodiments of the invention enable improved communication with a database comprising multiple clients utilizing multiple large data objects concurrently. For example when a client system interacts with a server with respect to a data object that is over a threshold size, the system may employ a communication methodology that minimizes system resource usage such as CPU utilization and network utilization.

In one embodiment of the invention when a client request for an object falls within the relevant size threshold, one or more embodiments of the invention segment the object into smaller size chunks. Hence the server is not required to assemble all data associated with a request at once, but is instead able to immediately start transmitting smaller segments of data. Allowing for the transmission of smaller data chunks prevents the server from allocating large blocks of memory to one object and although the server may be required to handle more memory allocations, each allocation is smaller in size and can therefore be processed much faster. The determination of the chunk size is dependent on inherent system resources such as the amount of server memory, and the available bandwidth of the network. In addition, the determination of chunk size is dependent on environmental factors such as the time of day, the day of the week, the number of users, the number of predicted users for a given time and day based on historical logging, and the current and predicted network utilization for a given time and day.

When utilizing embodiments of the invention, the latency between the time of the request and the delivery of data is typically low. In one embodiment of the invention when the server transmits smaller data blocks back to the requesting client, the server informs the client-system it will be sending a multi-part object and also identifies the size the object will be upon reassembly. Hence the client machine is made aware the request is being met by a stream of multi-part data to assemble rather than by a single object. The user of the client machine may or may not be aware that the data is being segmented and streamed for delivery. Software on the client system is configured to handle receipt and assembly of the multi-part object for executing and/or displaying the object. The reverse direction of data travel is accomplished in a similar manner with the client software requesting a transfer of data to a server as a series of smaller blocks of data unbeknownst to the end user. Each block transferred may be of a different size than a previous or subsequent block as the optimal chunk size for a system may change over time depending on environmental factors. The change in block size may occur during the transmittal of a given data object meaning that for example the initial chunks sent may be smaller or larger than the subsequent chunks sent depending on the number of users or predicted number of users for a given time or any other factor related to the performance of the system.

Although it is certainly possible and considered within the scope and spirit of this invention to utilize different approaches for transmitting large data objects in smaller data blocks, one possible implementation tunnels around or through existing infrastructures or systems. For instance, it is possible to use existing implementations for communicating data between a server and a client in instances where data size is not a problem and to then tunnel around or through these existing implementations when the data to be transmitted hits a threshold determined to unnecessarily burden the system.

In some cases implementing the communication methodology described above can be labor intensive and problematic. Hence, one aspect of the invention uses a protocol generator to generate and compile code that is capable of ensuring that new commands make use of the communication methodology, creating code that handles the overhead associated with implementing the new command and communication methodology. The processing for example may comprise packing, transmitting, unpacking, CRC error checking data when a configurable or dynamically calculated data threshold size is detected. The processing may also bypass embodiments of the invention when a threshold data size is not observed with regards to a particular request.

There are several advantages in adopting the communications methodology of the invention described herein. For instance, servers using this approach can serve a larger number of requests for large objects before running out of memory. Because there is no need to allocate server memory for the entire object the system allows for greater efficiency in instances where the data is read from the server and passed onto the client. Another benefit occurs in that the number of network collisions is significantly reduced by transmitting large objects to a client in pieces rather than in larger segments. In addition, since the chunk size may dynamically change based on performance related quantities such as environmental factors, the system remains optimally responsive regardless of external events.

DETAILED DESCRIPTION OF THE INVENTION

A method and apparatus for managing data object size in a multi-user environment will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
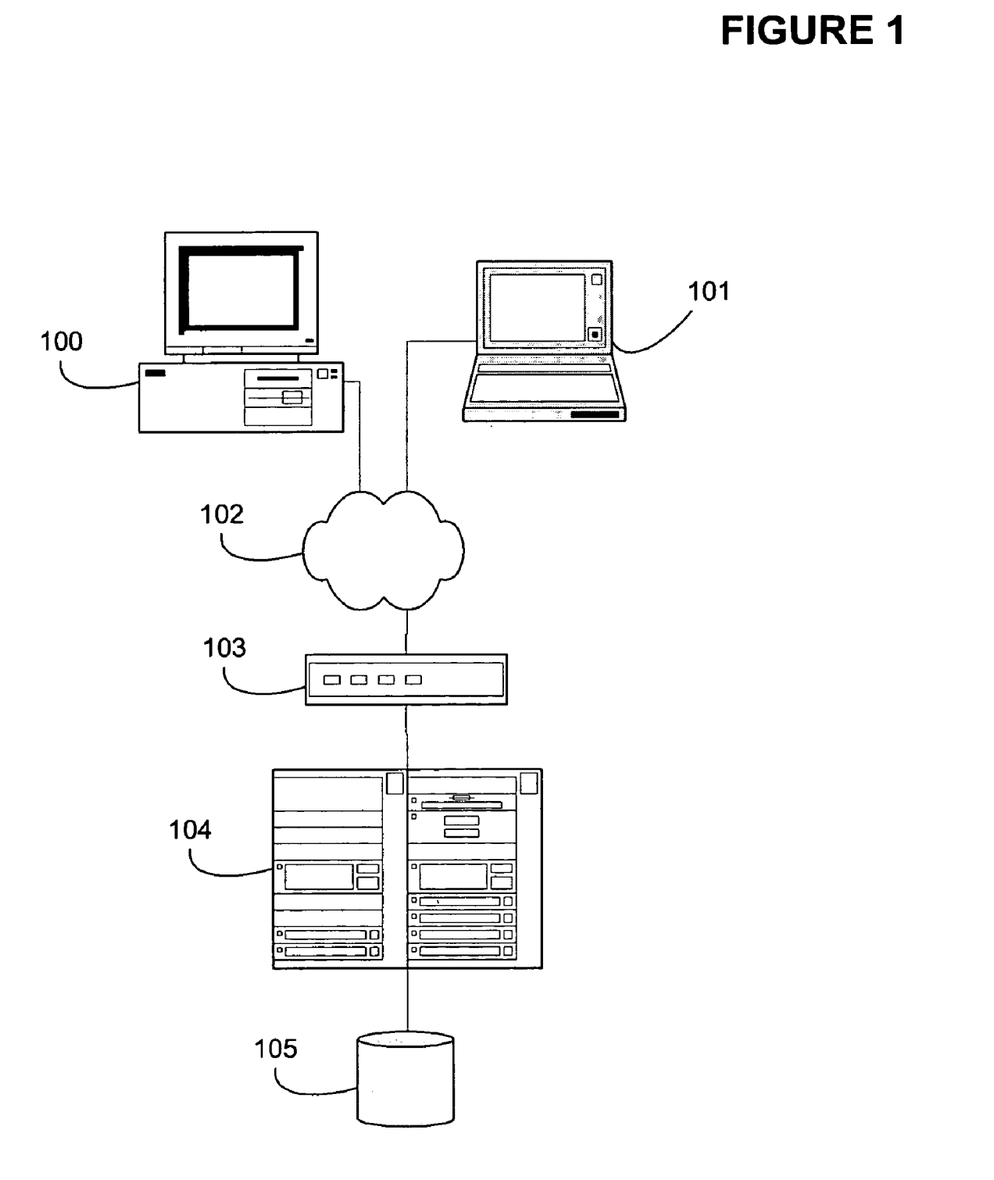
FIG. 1 illustrates a hardware architectural view of an embodiment of the invention.

FIG. 1 illustrates a hardware architectural view of an embodiment of the invention that enables improved communication with a database comprising multiple clients utilizing multiple large data objects concurrently. Client 100 and client 101 communicate with server 104 over network 102 via router 103 in order to obtain and store data objects in database 105. For example when a client system such as client 100 and/or 101 interacts with server 104 with respect to a data object stored in database 105 that is over a threshold size, the system may utilize a communication methodology that minimizes system resource usage such as CPU utilization, memory utilization and/or network utilization. The communication methodology is capable of transmitting data utilizing a chunk size that changes over time based on events that may alter the performance of the system.

Figure 2:
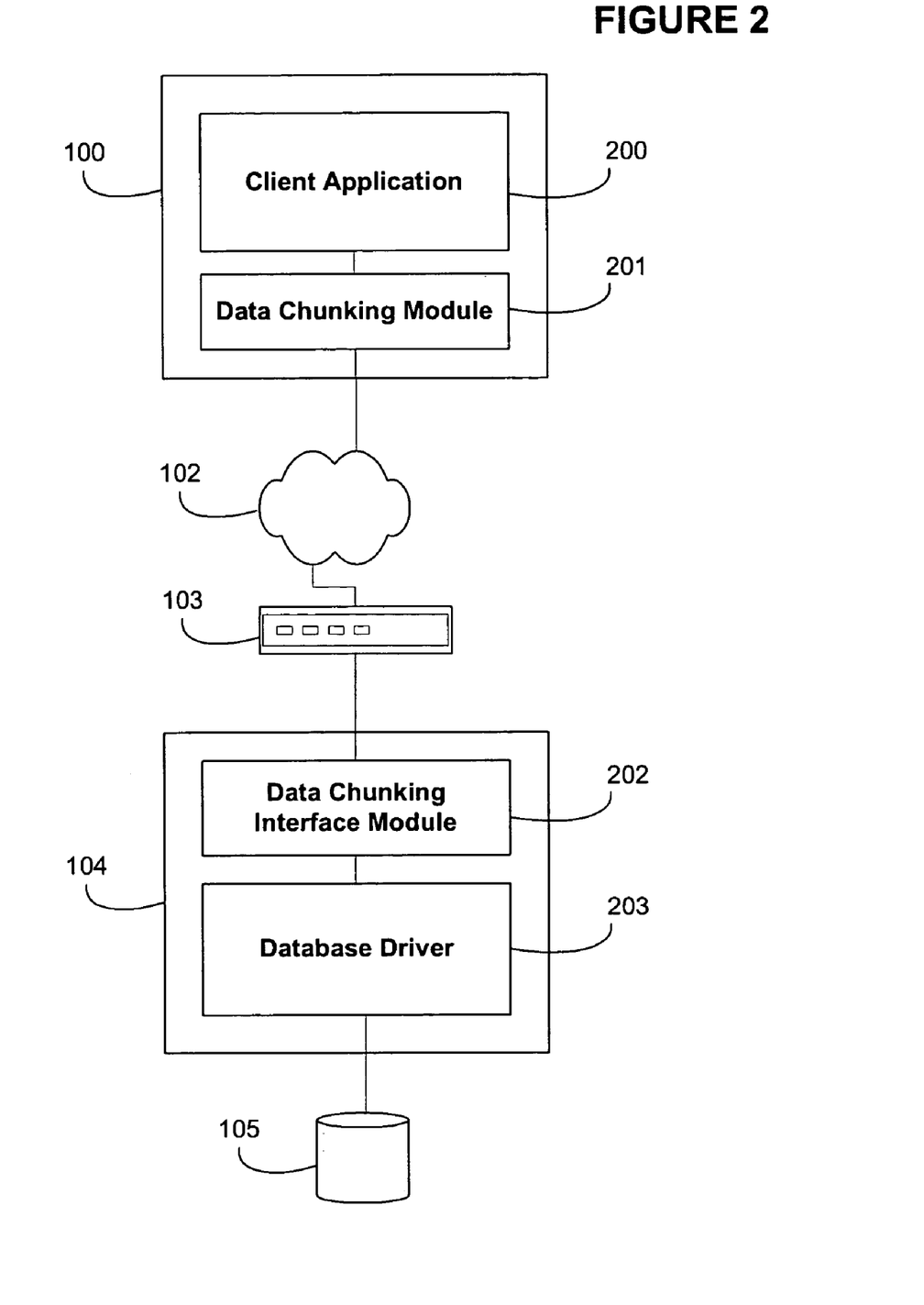
FIG. 2 illustrates an architectural view comprising software elements used in one or more embodiments of the invention.

FIG. 2 illustrates a software architectural view of one or more embodiments of the invention. In one embodiment of the invention when a client request from client application 200 for an object (such as a video stored in a database) falls within the relevant size threshold, data chunking module 201 and data chunking interface module 202 are capable of transferring the object between them using smaller size chunks. Hence server 104 is not required to assemble all data associated with a request at once, but is instead able to immediately start transmitting smaller segments of data to client 100. The chunking can be hidden from the user as when a database package is written to implement the chunking without the knowledge of a client, or with an interface that differs from the standard SQL interface. Regardless of the interface involved, any method of utilizing a chunk size threshold according to the description of the embodiments detailed herein is in keeping with the spirit of the invention. Allowing for the transmission of smaller data chunks prevents server 104 from allocating large blocks of memory to one object and although the server may be required to handle more memory allocations, each allocation is smaller in size and can therefore be processed much faster. The determination of the chunk size is dependent on inherent system resources such as the amount of server memory, and the available bandwidth of the network. In addition, the determination of chunk size is dependent on environmental factors such as the time of day, the day of the week, the number of users, the number of predicted users for a given time and day based on historical logging, and the current and predicted network utilization for a given time and day. In one or more embodiments of the invention the calculation of the chunk size takes into account the current state of the users and memory utilized in the system and the predicted number of users and memory and network bandwidth utilized based on historical observations. As the transfer of data chunks is spread over time, embodiments of the invention are capable of changing the chunk size and chunk size threshold dynamically while a transfer is taking place. Note that although a chunk size is used as a threshold and transfer size for data, these two elements may be of differing size as one skilled in the art will appreciate. For example, a chunk size of 100 MB may be used to segment any data object over 100 MB into chunks of 100 MB, or alternatively, a chunk size of 100 MB may be used to segment any data object over 100 MB into 25 MB transfer chunks. Regardless of the data chunk size or optional transfer chunk size, embodiments of the invention are capable of obtaining and utilizing these elements statically at configuration time or dynamically while running.

When utilizing embodiments of the invention, the latency between the time of the request and the delivery of data is typically low. In one embodiment of the invention when server 104 transmits smaller data blocks back to requesting client 100, server 104 informs client 100 that it will be sending a multi-part object and also identifies the size the object will be upon reassembly. Hence client 100 is made aware the request is being met by a stream of multi-part data to assemble rather than by a single object even though this may be transparent to the user of client 100. Each block transferred may be of a different size than a previous or subsequent block as the optimal chunk size for a system may change over time depending on environmental factors. The change in block size may occur during the transmittal of a given data object meaning that for example the initial chunks sent may be smaller or larger than the subsequent chunks sent depending on the number of users or predicted number of users for a given time.

Although it is certainly possible and considered within the scope and spirit of this invention to utilize different approaches for transmitting large data objects in smaller data blocks, one possible implementation tunnels around or through existing infrastructures or systems. For instance, it is possible to use existing implementations for communicating data between a server and a client in instances where data size is not a problem and to then tunnel around or through these existing implementations when the data to be transmitted hits a threshold determined to unnecessarily burden the system. In another embodiment 802.1Q VLANs can be utilized to send fewer Ethernet packets that are larger than the 1500 byte limit placed on standard Ethernet packets. Breaking a large data object into smaller chunks and then transmitting these chunks with packets that are larger than normal is unobvious. For example each packet that is received by a computer causes an interrupt that generally comprises a fixed processing time. Utilizing 802.1Q packets that are larger than the standard packets can drop the number of interrupts for a given overall large data object transfer by a factor of 5. Implementing a VLAN using 802.1Q may require compatible hardware components that may be incompatible with existing routers and switches however and is appropriate for corporate LANs where the equipment is under the control of an organization.

Figure 3:
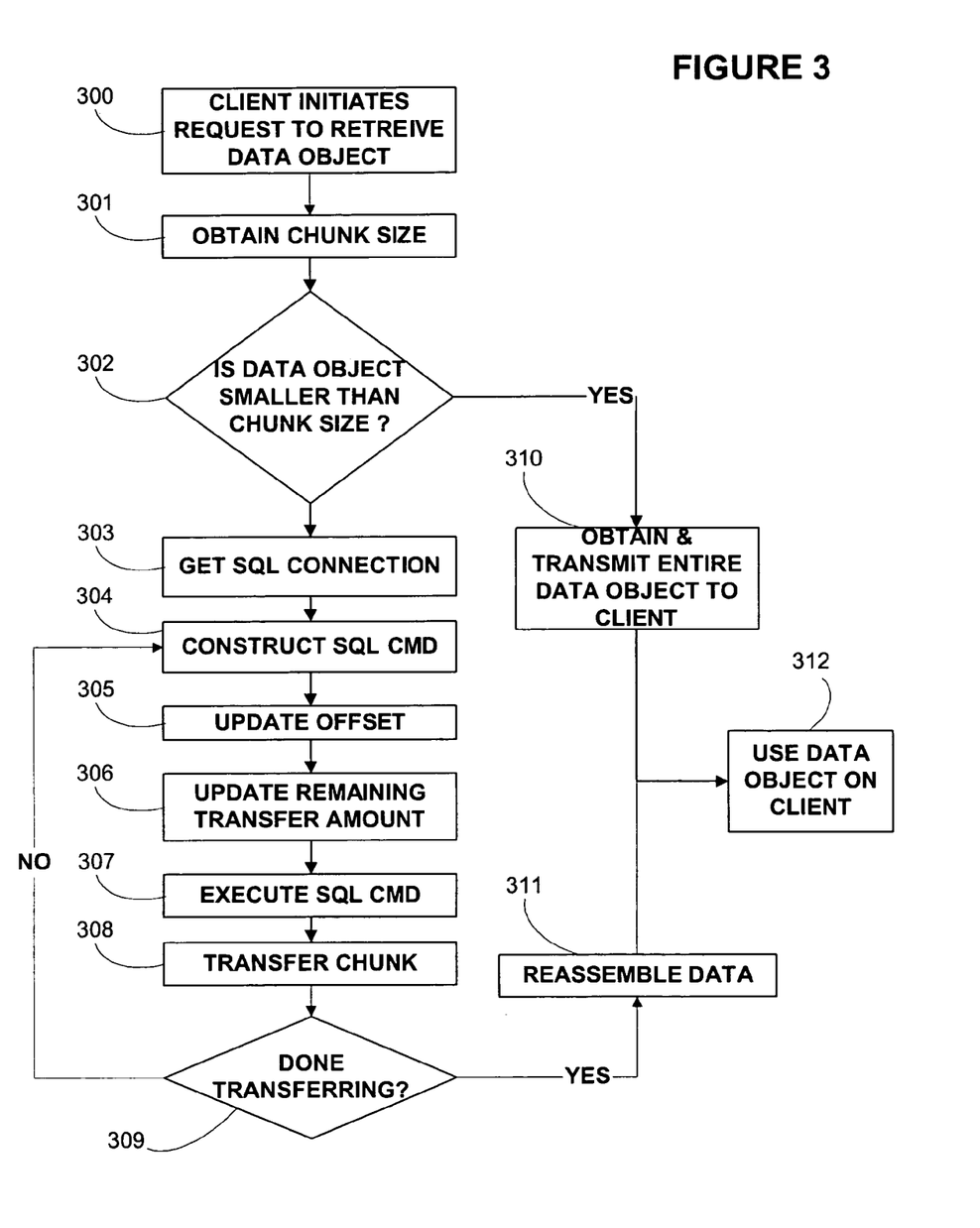
FIG. 3 illustrates a flow chart showing a request for data from a client to a server and the processing involved in returning the result to the client.

FIG. 3 illustrates a flow chart showing a request for data from a client to a server and the processing involved in returning the result to the client. Client 100 or client 101 initiates a request to retrieve a data object at 300. This may involve utilizing a custom API or a SQL API that transparently obtains a chunk size and optionally a chunk transfer size without knowledge of the user. The chunk size and optionally the chunk transfer size are obtained from server 104 at 301. The size of the data object is retrieved from the database at 302 and compared to the chunk size. If the data object is larger than the chunk size, then data chunking interface module 202 as shown in FIG. 2 obtains a SQL connection at 303, constructs a SQL command at 304, updates the offset into the data object at 305, updates the remaining transfer amount at 306, executes the SQL command at 307 and transfers a chunk (either of chunk size or optional chunk transfer size as previously discussed) to data chunking module 201 on client 100. The process of constructing (or altering) a SQL command, updating the offset, updating the remaining transfer amount, executing the sequel command and transferring a chunk is branched to at 309 if there is more data to transfer. Once all of the data has been transferred it is reassembled at 311 and used by the client at 312. If the size of the data object is smaller than the chunk size, then a single SQL sequence is performed and the entire data object is transferred at 310 to client 100 and used at 312.

Figure 4:
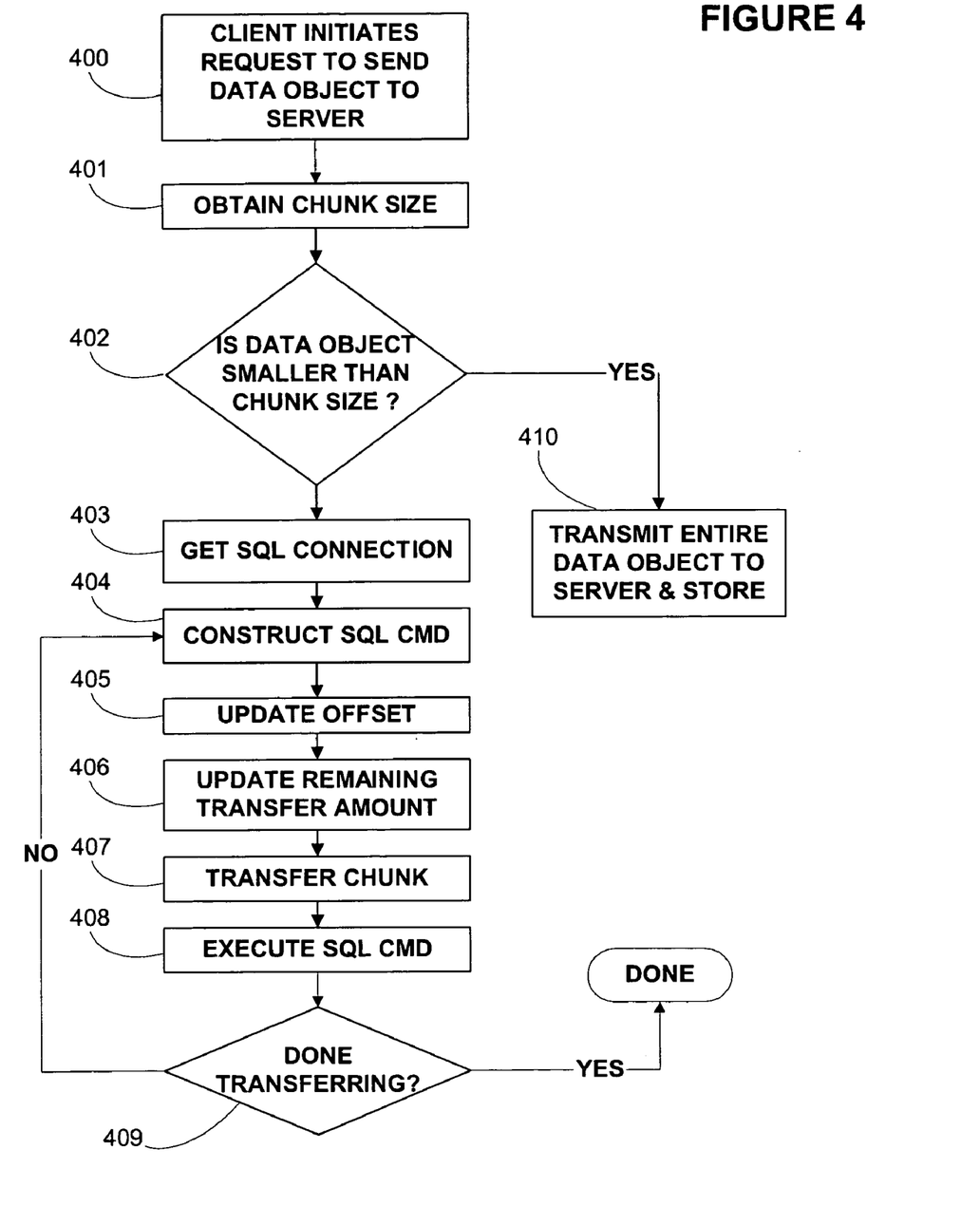
FIG. 4 illustrates a flow chart showing an update to data to a server from a client and the processing involved in sending the data to the server.

FIG. 4 illustrates a flow chart showing an update to data to a server from a client and the processing involved in sending the data to the server. Client 100 or client 101 initiates a request to send (create or update) a data object at 400. This may involve utilizing a custom API or a SQL API that transparently obtains a chunk size and optionally a chunk transfer size without knowledge of the user. The chunk size and optionally the chunk transfer size are obtained from server 104 at 401. The size of the data object is known to client 100 and is compared to the chunk size retrieved from server 104. If the data object is larger than the chunk size, then data chunking interface module 202 as shown in FIG. 2 obtains a SQL connection at 403, constructs a SQL command at 404, updates the offset into the data object at 405, updates the remaining transfer amount at 406, transfers a chunk at 407 (either of chunk size or optional chunk transfer size as previously discussed) to data chunking interface module 202 on server 104 and executes the SQL command at 408 to store the data. The process of constructing (or altering) a SQL command, updating the offset, updating the remaining transfer amount, transferring a chunk and executing the sequel command is branched to at 409 if there is more data to transfer. If the size of the data object is smaller than the chunk size, then a single SQL sequence is performed and the entire data object is transferred at 410 to server 104 and stored using a single SQL call.

Figure 5:
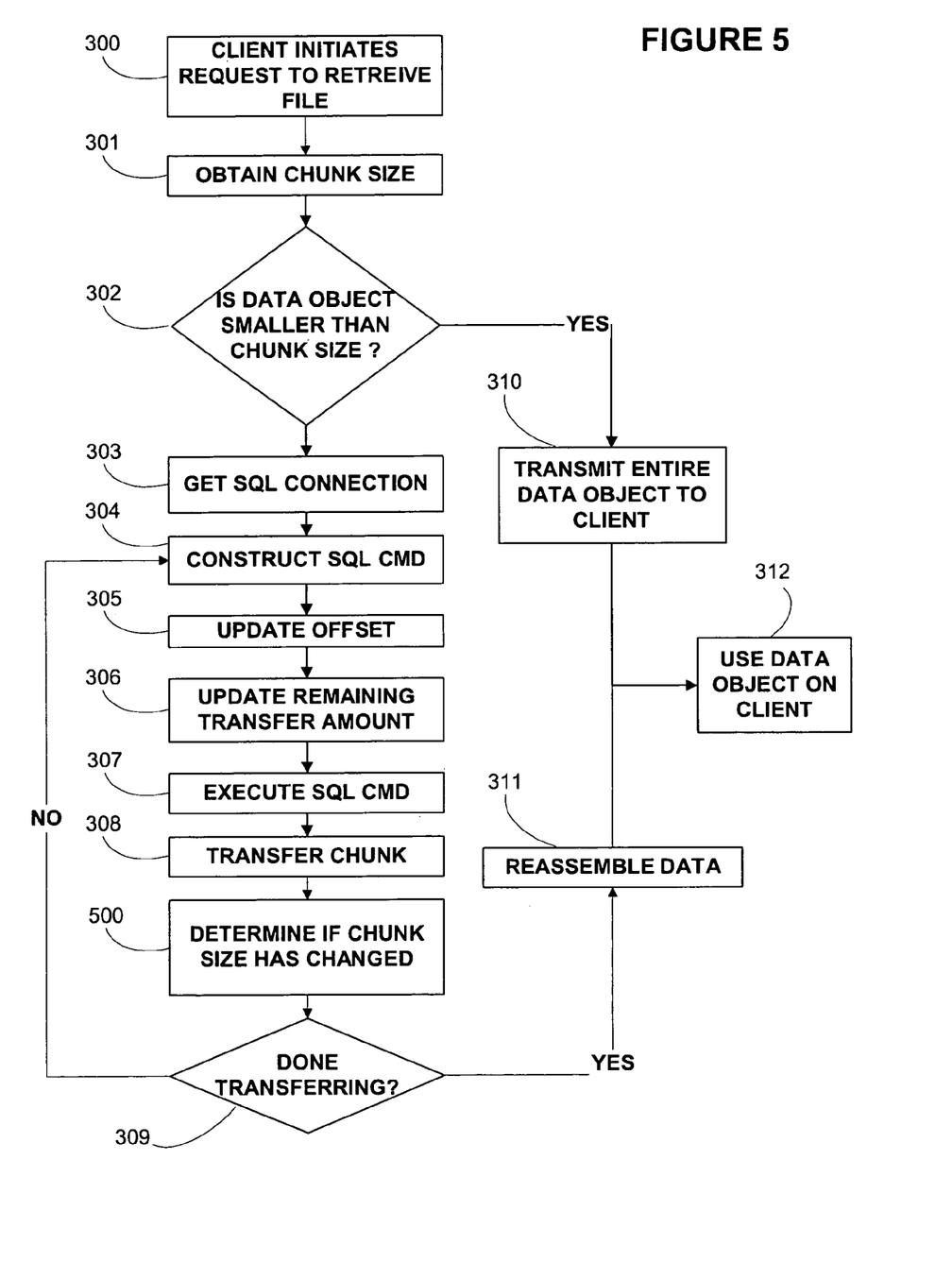
FIG. 5 illustrates a flow chart showing a request for data from a client to a server and an embodiment of dynamic data block size processing involved in returning the result to the client.

FIG. 5 illustrates a flow chart showing a request for data from a client to a server and an embodiment of dynamic data block size processing involved in returning the result to the client. Client 100 or client 101 initiates a request to retrieve a data object at 300. This may involve utilizing a custom API or a SQL API that transparently obtains a chunk size and optionally a chunk transfer size without knowledge of the user. The chunk size and optionally the chunk transfer size are obtained from server 104 at 301. The size of the data object is retrieved from the database at 302 and compared to the chunk size. If the data object is larger than the chunk size, then data chunking interface module 202 as shown in FIG. 2 obtains a SQL connection at 303, constructs a SQL command at 304, updates the offset into the data object at 305, updates the remaining transfer amount at 306, executes the SQL command at 307 and transfers a chunk at 308 (either of chunk size or optional chunk transfer size as previously discussed) to data chunking module 201 on client 100. The chunk size and optionally the transfer size is/are checked at 500 and if either quantity has changed at 500, then the next loop will use the new quantity in transferring data. The process of constructing (or altering) a SQL command, updating the offset, updating the remaining transfer amount, executing the sequel command, transferring a chunk and checking for chunk size and/or chunk transfer size changes is branched to at 309 if there is more data to transfer. Once all of the data has been transferred it is reassembled at 311 and used by the client at 312. If the size of the data object is smaller than the chunk size, then a single SQL sequence is performed and the entire data object is transferred at 310 to client 100 and used at 312.

Figure 6:
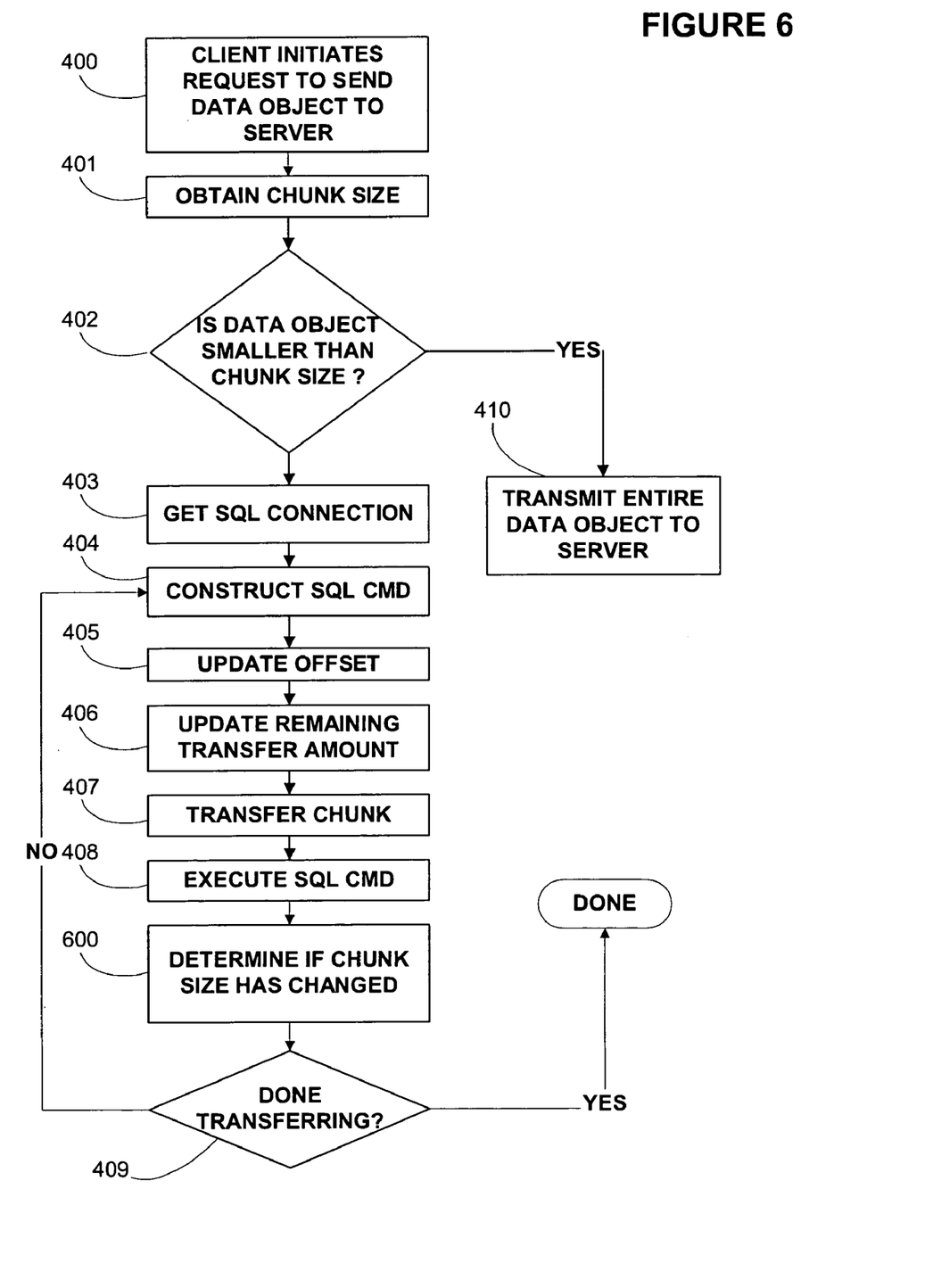
FIG. 6 illustrates a flow chart showing an update to data to a server from a client and an embodiment of dynamic data block size processing involved in sending the data to the server.

FIG. 6 illustrates a flow chart showing an update to data to a server from a client and an embodiment of dynamic data block size processing involved in sending the data to the server. Client 100 or client 101 initiates a request to send (create or update) a data object at 400. This may involve utilizing a custom API or a SQL API that transparently obtains a chunk size and optionally a chunk transfer size without knowledge of the user. The chunk size and optionally the chunk transfer size if different are obtained from server 104 at 401. The size of the data object is known to client 100 and is compared to the chunk size retrieved from server 104. If the data object is larger than the chunk size, then data chunking interface module 202 as shown in FIG. 2 obtains a SQL connection at 403, constructs a SQL command at 404, updates the -offset into the data object at 405, updates the remaining transfer amount at 406, transfers a chunk at 407 (either of chunk size or optional chunk transfer size as previously discussed) to data chunking interface module 202 on server 104 and executes the SQL command at 408 to store the data. The chunk size and optionally the transfer size are checked at 600 and if either quantity has changed at 600, then the next loop will use the new quantity in transferring data. The process of constructing (or altering) a SQL command, updating the offset, updating the remaining transfer amount, transferring a chunk and executing the sequel command is branched to at 409 if there is more data to transfer. If the size of the data object is smaller than the chunk size, then a single SQL sequence is performed and the entire data object is transferred at 410 to server 104 and stored using a single SQL call.

There are several advantages in adopting the communications methodology of the invention described herein. For instance, servers using this approach can serve a larger number of requests for large objects before running out of memory. Because there is no need to allocate server memory for the entire object the system allows for greater efficiency in instances where the data is read from the server and passed onto the client. Another benefit occurs in that the number of network collisions is significantly reduced by transmitting large objects to a client in pieces rather than in larger segments. In addition, since the chunk size may dynamically change based on environmental factors, the system remains optimally responsive regardless of external events.

Thus embodiments of the invention directed to a method and apparatus for managing data objects in a multi-user environment have been exemplified to one of ordinary skill in the art. The claims, however, and the full scope of any equivalents are what define the metes and bounds of the invention.

What is claimed is:

1. In a computer system, a method for managing data objects comprising:
    obtaining a chunk size from a server via computer readable program code;
    comparing a data object size with said chunk size;
    requesting a SQL connection;
    constructing a SQL command to interact with a data object;
    updating an offset;
    updating a remaining transfer amount;
    executing a SQL command;
    transferring a chunk of data associated with said data object over said SQL connection to a requesting client;
    determining if said chunk size has been changed to a new chunk size after said transferring said chunk of data;
    said updating of said offset further comprising utilizing said new chunk size in said updating of said offset;
    said updating of said remaining transfer amount further comprising utilizing said new chunk size in said updating of said remaining transfer amount; and,
    repeating said constructing said SQL command, said updating said offset, said updating said remaining transfer amount, said executing said SQL command and said transferring of said chunk of data until said data object is completely transferred.

2. The method of claim 1 wherein said chunk size is based on an inherent factor.

3. The method of claim 2 wherein said inherent factor is associated with server memory.

4. The method of claim 2 wherein said inherent factor is associated with network bandwidth.

5. The method of claim 1 wherein said chunk size is based on an environmental factor.

6. The method of claim 5 wherein said environmental factor is based on a time of day.

7. The method of claim 5 wherein said environmental factor is based on a day of the week.

8. The method of claim 5 wherein said environmental factor is based on a number of users.

9. The method of claim 5 wherein said environmental factor is based on a number of predicted users.

10. The method of claim 5 wherein said environmental factor is based on a network utilization.

11. The method of claim 5 wherein said environmental factor is based on a predicted network utilization.

12. A computer program product for managing data objects comprising:
    a computer usable memory medium having computer readable program code embodied therein wherein said computer readable program code comprises a data chunking module that is configured to:
    obtain a chunk size from a server via computer readable program code;
    compare a data object size with said chunk size;
    request a SQL connection;
    construct a SQL command to interact with a data object;
    update an offset;
    update a remaining transfer amount;
    execute a SQL command;
    transfer a chunk of data associated with said data object over said SQL connection to a requesting client;
    determine if said chunk size has been changed to a new chunk size after said transfer and chunk of data;
    said update of said offset further comprising utilization of said new chunk size in said update of said offset;
    said update of said remaining transfer amount further comprising utilization of said new chunk size in said update of said remaining transfer amount; and,
    repeat said construct said SQL command, said update said offset, said update said remaining transfer amount, said execute said SQL command and said transmit of said chunk of data until said data object is completely transferred.

13. The computer program product of claim 12 wherein said chunk size is based on an inherent factor.

14. The computer program product of claim 13 wherein said inherent factor is associated with server memory.

15. The computer program product of claim 13 wherein said inherent factor is associated with network bandwidth.

16. The computer program product of claim 12 wherein said chunk size is based on an environmental factor.

17. The computer program product of claim 16 wherein said environmental factor is based on a time of day.

18. The computer program product of claim 16 wherein said environmental factor is based on a day of the week.

19. The computer program product of claim 16 wherein said environmental factor is based on a number of users.

20. The computer program product of claim 16 wherein said environmental factor is based on a number of predicted users.

21. The computer program product of claim 16 wherein said environmental factor is based on a network utilization.

22. The computer program product of claim 16 wherein said environmental factor is based on a predicted network utilization.

23. In a computer system, an apparatus for managing data objects comprising:

means for obtaining a chunk size from a server via computer readable program code;

means for comparing a data object size with said chunk size;

means for requesting a SQL connection;

means for constructing a SQL command to interact with a data object;

means for updating an offset;

means for updating a remaining transfer amount;

means for executing a SQL command;

means for transferring a chunk of data associated with said data object over said SQL connection;

means for determining if said chunk size has been chanced to a new chunk;

said means for updating said offset further comprising means for utilizing said new chunk size in said means for updating said offset;

said means for updating said remaining transfer amount further comprising means for utilizing said new chunk size in said means for updating said remaining transfer amount; and, means for repeating said means for constructing said SQL command, said means for updating said offset, said means for updating said remaining transfer amount, said means for executing said SQL command and said means for transmitting said chunk of data until said data object is completely transferred.

* * * * *